(12) United States Patent
Monbrun et al.

(10) Patent No.: US 10,421,241 B2
(45) Date of Patent: Sep. 24, 2019

(54) DRUM FOR PRODUCING A TIRE BLANK

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Florent Monbrun, Clermont-Ferrand (FR); Hélène Jaquet, Clermont-Ferrand (FR); Dominique Leblanc, Clermont-Ferrand (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 275 days.

(21) Appl. No.: 15/542,099

(22) PCT Filed: Jan. 15, 2016

(86) PCT No.: PCT/FR2016/050071
§ 371 (c)(1),
(2) Date: Jul. 7, 2017

(87) PCT Pub. No.: WO2016/113510
PCT Pub. Date: Jul. 21, 2016

(65) Prior Publication Data
US 2018/0272641 A1    Sep. 27, 2018

(30) Foreign Application Priority Data

Jan. 16, 2015  (FR) .................................. 15 50379

(51) Int. Cl.
*B29D 30/24* (2006.01)
(52) U.S. Cl.
CPC ........... *B29D 30/242* (2013.01); *B29D 30/24* (2013.01); *B29D 30/245* (2013.01)

(58) Field of Classification Search
CPC ..... B29D 30/24; B29D 30/242; B29D 30/245
See application file for complete search history.

(56) References Cited

U.S. PATENT DOCUMENTS

| | | | | |
|---|---|---|---|---|
| 2,416,523 A | * | 2/1947 | Haren .................. | B29D 30/242 |
| | | | | 156/418 |
| 2,655,977 A | * | 10/1953 | Hodgkins .............. | B29D 30/24 |
| | | | | 152/54 |

(Continued)

FOREIGN PATENT DOCUMENTS

| EP | 1 389 520 A2 | 2/2004 |
|---|---|---|
| WO | WO 2014/057196 A1 | 4/2014 |

OTHER PUBLICATIONS

Apr. 1, 2016 International Search Report and Written Opinion in International Patent Appln. No. PCT/FR2016/050071.

(Continued)

*Primary Examiner* — Timothy Kennedy
(74) *Attorney, Agent, or Firm* — Venable LLP (57) ABSTRACT

A drum is provided for building a green tire casing. The drum includes sectors, an expander, and an adjuster. The sectors form a circumferential face of the drum. The expander moves the sectors in a radial direction such that, at any given time, all the sectors extend at a same distance from an axis of the drum. The adjuster moves the sectors in the radial direction separately from movement of the sectors caused by the expander. Movement of the sectors by the adjuster is such that, at any given time, all the sectors extend at an equal distance from the axis of the drum. The expander is usable to move the sectors regardless of a position of the sectors caused by an operation of the adjuster.

17 Claims, 5 Drawing Sheets

(56) References Cited

U.S. PATENT DOCUMENTS

| | | | | |
|---|---|---|---|---|
| 3,038,526 A * | 6/1962 | Wilhelm | B29D 30/24 156/420 |
| 3,140,216 A * | 7/1964 | Shilts | B29D 30/24 156/415 |
| 3,374,138 A * | 3/1968 | Porter | B29D 30/24 156/132 |
| 3,485,692 A * | 12/1969 | Frazier | B29D 30/245 156/123 |
| 3,485,700 A * | 12/1969 | Wenger | B29D 30/242 156/417 |
| 3,536,566 A * | 10/1970 | Frazier | B29D 30/245 156/415 |
| 3,607,558 A * | 9/1971 | Nebout | B29D 30/245 156/415 |
| 3,644,162 A * | 2/1972 | Appleby | B29D 30/24 156/415 |
| 3,654,026 A * | 4/1972 | Brinkley | B29D 30/26 156/418 |
| 3,779,835 A * | 12/1973 | Lohr | B29D 30/24 156/417 |
| 3,817,812 A * | 6/1974 | Yabe | B29D 30/24 156/415 |
| 3,847,706 A * | 11/1974 | Yabe | B29D 30/24 156/414 |
| 3,867,229 A * | 2/1975 | Marra | B29D 30/24 156/415 |
| 3,948,717 A * | 4/1976 | Suzuki | B29D 30/24 156/415 |
| 3,971,694 A * | 7/1976 | Gazuit | B29D 30/245 156/415 |
| 4,239,579 A * | 12/1980 | Felten | B29D 30/247 156/132 |
| 4,290,472 A * | 9/1981 | Bryant | B29D 30/245 156/132 |
| 4,614,562 A * | 9/1986 | Jones | B29D 30/247 156/402 |
| 5,066,354 A * | 11/1991 | Benjamin | B29D 30/24 279/2.13 |
| 5,203,947 A * | 4/1993 | Boeker | B29D 30/24 156/414 |
| 5,269,870 A * | 12/1993 | Mori | B29D 30/242 156/417 |
| 5,490,897 A * | 2/1996 | Miyanaga | B29D 30/245 156/415 |
| 5,618,374 A * | 4/1997 | Byerley | B29D 30/242 156/418 |
| 5,635,016 A * | 6/1997 | Byerley | B29D 30/242 156/406.2 |
| 6,013,147 A * | 1/2000 | Byerley | B29D 30/242 156/110.1 |
| 6,408,919 B2 * | 6/2002 | Cordaillat | B29D 30/244 156/132 |
| 6,880,603 B2 * | 4/2005 | Akiyama | B29D 30/245 156/400 |
| 8,585,845 B2 * | 11/2013 | Weaver | B29D 30/245 156/132 |
| 2007/0102120 A1 * | 5/2007 | Yoshii | B29D 30/24 156/394.1 |
| 2010/0101732 A1 * | 4/2010 | Howley | B29D 30/242 156/414 |
| 2012/0073728 A1 * | 3/2012 | Takasuga | B29D 30/245 156/110.1 |
| 2012/0090787 A1 * | 4/2012 | Jones | B29D 30/242 156/415 |
| 2012/0168087 A1 * | 7/2012 | Byerley | B29D 30/242 156/417 |
| 2013/0160951 A1 * | 6/2013 | De Graaf | B29D 30/24 156/414 |
| 2013/0327482 A1 * | 12/2013 | Astier | B29D 30/242 156/414 |
| 2014/0360673 A1 * | 12/2014 | Marcus, Jr. | B29D 30/242 156/417 |
| 2015/0224729 A1 * | 8/2015 | Jones | B29D 30/24 156/414 |
| 2016/0159023 A1 * | 6/2016 | Delorme | B29D 30/242 156/110.1 |
| 2016/0167327 A1 * | 6/2016 | Delorme | B29D 30/242 156/110.1 |
| 2018/0141294 A1 * | 5/2018 | Baldoni | B29D 30/24 |

OTHER PUBLICATIONS

International Search Report issued by WIPO dated Apr. 1, 2016, in connection with International Application No. PCT/FR2016/050071 (with English translation attached)

* cited by examiner

DRUM FOR PRODUCING A TIRE BLANK

FIELD OF THE INVENTION

The invention relates to drums for producing green tires.

RELATED ART

The elements that form the assembly made up of the crown belt and the tread of a green tire for a wheel are assembled on a tire-building drum, also known as a "crown form". These elements mainly comprise raw rubber. Once assembled, the tread is removed from the drum and applied to a carcass produced separately. The combination of the two forms a tire. The shaping of the latter yields the green blank which is then cured to vulcanize the rubber.

The circumferential face of the drum which serves to support the tread during production is formed by sectors that are mounted so as to be able to move in a radial direction. Thus, retraction of all or some of the sectors allows the tread to be extracted once its assembly has been completed.

A drum of this type is known for example from the document EP-1 389 520. The advantage of that drum is that it ensures good absorption of radial loads, in particular during the wrapping of a strip around the drum at high speed in order to produce the tread. However, the adjustment of the diameter of the drum provides little choice for the positions of the sectors and is difficult to effect. Moreover, once the diameter of the drum has been adjusted, it is not possible to vary this diameter while retaining the overall shape of the drum.

BRIEF DESCRIPTION OF EMBODIMENTS OF THE INVENTION

It is an aim of the invention to provide a drum which ensures good absorption of loads while having simple kinematics for the movement of the sectors and which provides greater freedom for changing the diameter of the drum.

To this end, a drum for building a green tire casing is provided according to the invention, which comprises:
sectors that form a circumferential face of the drum,
expansion means that are able to move the sectors in a radial direction with respect to an axis of the drum such that, at any time during the movement, all of the sectors extend at one and the same distance from the axis, and
adjustment means that are separate from the expansion means and are able to move the sectors in a radial direction such that, at any time during the movement by the adjustment means, all of the sectors extend at one and the same distance from the axis,
the expansion means being usable regardless of a position of the sectors under the effect of the adjustment means.

Thus, once the diameter of the drum has been chosen with the aid of the adjustment means, it remains possible to vary this diameter while retaining the overall configuration of the drum, for example in order to remove the tread from the drum. It is thus possible to carry out repeated expansion and retraction movements of the drum while retaining precise adjustment of the diameter of the drum. This also allows a saving of space, since it is no longer necessary to have several drums having different diameters, from a given range of diameters, a single drum according to the invention having a variable diameter, and also a saving of time, since any dismounting/mounting of the drum from/on the assembly machine is avoided.

Preferably, the expansion means and/or the adjustment means are able to move the sectors along a path perpendicular to the axis.

Advantageously, the adjustment means are disposed in series with at least some of the expansion means.

This is one way of ensuring that the expansion means are usable regardless of the position of the sectors that is determined by the adjustment means.

In one embodiment, the adjustment means are disposed in series with only some of the expansion means.

Preferably, some of the expansion means are designed to take up a fixed position in the radial direction with respect to the axis.

It is notably possible to dispose the latter expansion means close to the axis of rotation of the drum, thereby reducing the inertia of the latter and bringing about a saving of energy for driving it in rotation.

In one embodiment, the adjustment means connect the expansion means to a support of the drum.

Advantageously, the adjustment means and/or the expansion means form an irreversible mechanism.

In one embodiment, only the adjustment means form an irreversible mechanism. In another embodiment, only the expansion means form an irreversible mechanism. In yet another embodiment, the adjustment mechanism and the expansion mechanism each form an irreversible mechanism.

It is therefore not necessary to provide a member for keeping these means in the chosen position.

For example, the adjustment means comprise at least one cam mounted so as to be able to rotate about the axis.

Provision may be made for there to be at least two cams, which are connected together by at least one synchronization member that is separate from the expansion means and the sectors.

This arrangement makes it notably possible to retain two radial supporting means for each sector.

In one embodiment, the expansion means comprise at least one cylinder and components that are designed to convert a load on the cylinder parallel to the axis into a radial load.

Preferably, the expansion means are designed such that the components form at least one group in which the hinge pins of the components of the group extend in one and the same plane radial to the axis.

Thus, the loads generated in the radial direction at the sectors during the formation of the tread are transmitted to the support of the drum in this same radial direction without causing an axial component to arise. This ensures particularly robust radial holding of the sectors, this radial rigidity allowing the laying under tension of longitudinally reinforced strips of raw rubber in order to realize hooping of the crown belt which supports the tread of the green tire.

Provision can be made for example for the expansion means to comprise at least one upstream part, with reference to a direction of transmission of movement in these means that is able to load a downstream part of the expansion means that is mounted so as to slide against the upstream part.

Preferably, there are at least two upstream parts, which are connected together by at least one synchronization member that is separate from the adjustment means and the sectors.

In one embodiment, the expansion means comprise at least one upstream plate that is able to load at least one support of the expansion means that is mounted so as to slide against the plate.

Preferably, the expansion means and the adjustment means are designed such that each sector is connected to a support of the drum that is common to the sectors by means of the two mutually independent supporting means.

Here again, this ensures particularly robust radial holding of the sectors.

Preferably, each sector is a single part and/or rigid.

Also provided according to the invention is a method for producing a green tire, wherein at least a part of the green tire is produced on a drum in accordance with the invention.

BRIEF DESCRIPTION OF THE DRAWINGS

An embodiment of the drum according to the invention will now be described with reference to the appended drawings, in which.

DETAILED DESCRIPTION OF EMBODIMENTS OF THE INVENTION

The figures illustrate a drum 2 according to one embodiment of the invention. This drum is used for assembling the elements that form a tread for a green tire blank. The tire is intended for a wheel of a vehicle that may be a utility vehicle, a light vehicle, a passenger vehicle, a vehicle of the heavy goods type or alternatively a construction plant vehicle.

The drum comprises a central support or shaft 4 and has an overall shape exhibiting symmetry of revolution of axis 6 which forms the main axis of the drum. Throughout the rest of the text, and unless indicated to the contrary, the axial direction denotes a direction parallel to the axis 6 and the radial direction denotes any direction radial thereto.

The drum has external sectors 8 which extend at the periphery of the drum to form the external circumferential face 10 of the drum that forms the working face on which the green tire elements are disposed. In this particular instance, this face 10 has the overall shape of a cylinder of circular cross section in a plane perpendicular to the axis 6. Therefore, the drum here forms for example what a person skilled in the art often refers to as a "flat form".

In this particular instance, the sectors 8 are all identical to one another. There are 24 of them in the present example, but this number could vary. In this example, each sector is rigid and formed from a single part. It has here the overall shape of a comb. Thus, the sector has a rectangular overall shape, the largest dimension of which is parallel to the axis 6. The two longitudinal edges of the rectangle are cut to form teeth such that each edge of a comb has teeth that are able to interlock with the teeth on the edge of the adjacent comb. Since the sectors are able to move in a direction perpendicular to the axis 6, this shape of the sectors makes it possible to vary their distance with respect to the axis while ensuring a degree of continuity of material between the combs around the circumference of the drum, the teeth of the adjacent combs being interlocked to a greater or lesser extent depending on the radial position of the sectors.

The members which connect the sectors to the support 4 and which both guide them and drive them will now be presented. The members which are located in the left-hand part of the drum in FIGS. 3 to 6 will be described, in the knowledge that the drum has, in the right-hand part, analogous members that extend symmetrically to the first with respect to a mid-plane of symmetry perpendicular to the axis 6.

Figure 3:
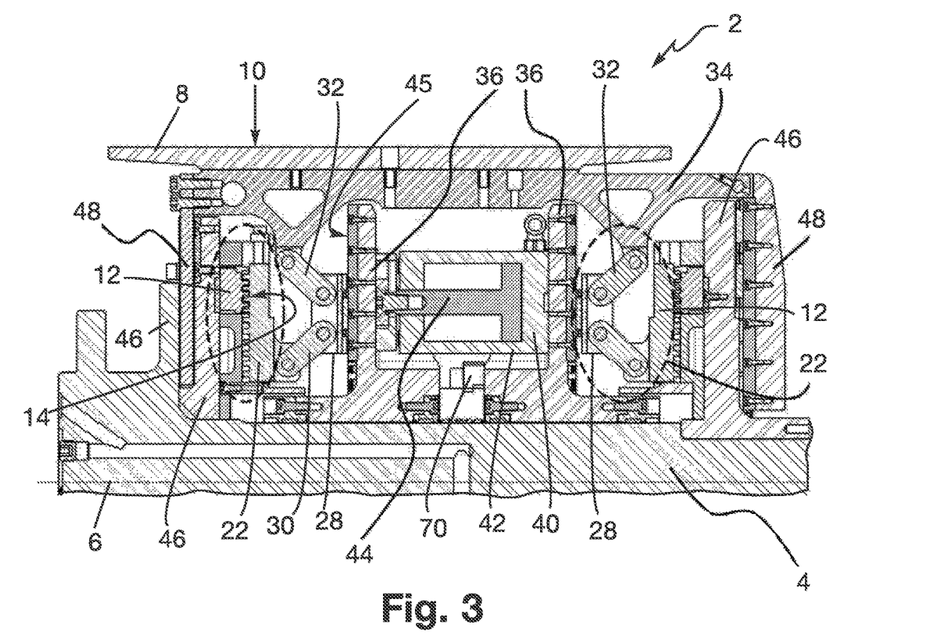
FIGS. 3 to 6 are partial views in axial section of the drum from FIG. 1, showing different configurations of the sectors.

The drum has a cam 12 comprising a plate of annular shape having two faces perpendicular to the axis 6, said plate being mounted so as to be able to rotate coaxially about the latter. In FIG. 3, the cam extends in the left-hand part of the drum and has, on its right-hand face 14, also visible in FIG. 8, a groove 16 in the form of a spiral centred on the axis 6. A drive (not shown) sets the cam in rotation about the axis with respect to the support 4.

Figure 8:
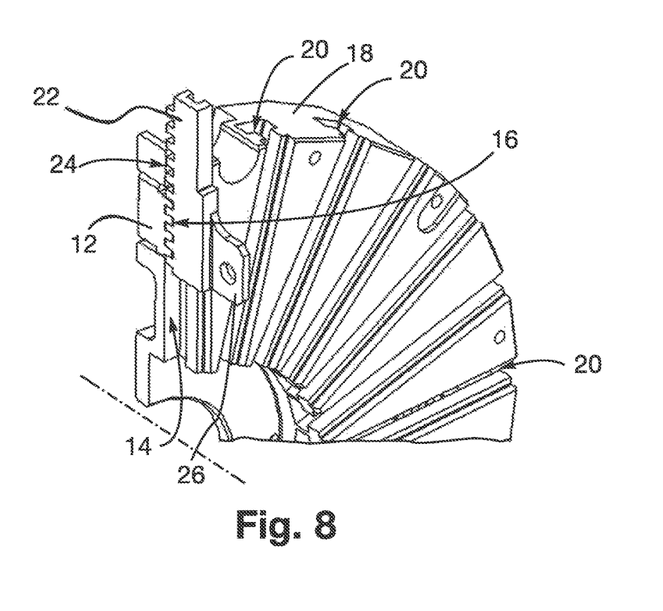
FIG. 8 is a perspective view of a part of the drum in the region of the cams.

The drum comprises a disc 18, also perpendicular to the axis 6 and centred on the outlet, which comprises radial housings 20 that are visible notably in FIG. 8. Each of these housings receives a jaw 22 that is mounted so as to be able to slide in the housing in a direction perpendicular to the axis with respect to the disc. With the disc 18 being side-by-side with the cam 12, each housing 20 is open in the direction of the latter in order to allow the jaw to engage with the spiral 16. To this end, the jaw has teeth 24 complementary to the spiral. It also has a rear lower lug 26 that extends in the opposite direction to that of the cam. Each jaw housing comprises upper 101 and lower 102 abutments, referenced in FIG. 4, that define the extreme points of the end of sliding travel of the jaw. The jaw/spiral system, which is part of the adjustment means, thus forms an irreversible mechanism.

The drum also comprises a connecting-rod support 28 and two rectilinear connecting rods 30 and 32, each of which is hinged directly to the support. In addition, the connecting rod 30 is hinged directly to the lug 26. The two connecting rods and the connecting-rod support form a toggle joint.

For each sector, the drum also comprises a sector support 34. There are therefore also 24 of the supports in this particular instance. The support has an elongate shape in a direction parallel to the axis 6 and has, in the left-hand part, a base to which the connecting rod 32 is directly hinged. All of the hinge pins of the connecting rods are mutually parallel and extend in a direction that is orthogonal to the axis 6 and does not intersect the latter. The hinge pins that hinge the connecting rods to the connecting-rod support 28 extend in one and the same plane perpendicular to the axis 6. The same goes for the two other hinge pins that hinge the connecting rods to the lugs 26 and to the sector support 34, respectively. These properties also hold regardless of the configuration of the drum, that is to say regardless of the position of the sectors that is determined by the expansion means or the regulating means, as will be seen.

As stated, the drum comprises, in the right-hand part in FIG. 3, analogous parts that take up a symmetrical position to those which have just been described. Therefore, a cam 12, a disc 18 with jaws 22, a connecting-rod support 28, connecting rods 30 and 32 and another stand for the same sector support 35 are found.

The sector 8 is rigidly fixed to the sector support 34 such that the position of the latter entirely determines the position of the sector.

The drum also comprises two actuating plates 36 that each also extend in a plane perpendicular to the axis and are centred on the latter. The plates are mounted so as to slide on the central support 4. Between the plates, away from the support 4, the drum comprises four actuators 40 that are each, in this particular instance, in the form of a pneumatic cylinder, comprising a body 42 and a piston 44. The free end of the piston is connected to the left-hand plate 36, while the opposite end of the body from the piston is rigidly fixed to the right-hand plate. The cylinders are in this case housed inside the drum.

The left-hand face 45 of the left-hand plate 36, on the opposite side from the cylinder, forms a sliding track for the connecting-rod support 28. The same goes in the right-hand part of the drum for the other plate and the other connecting-rod support.

Figure 5:
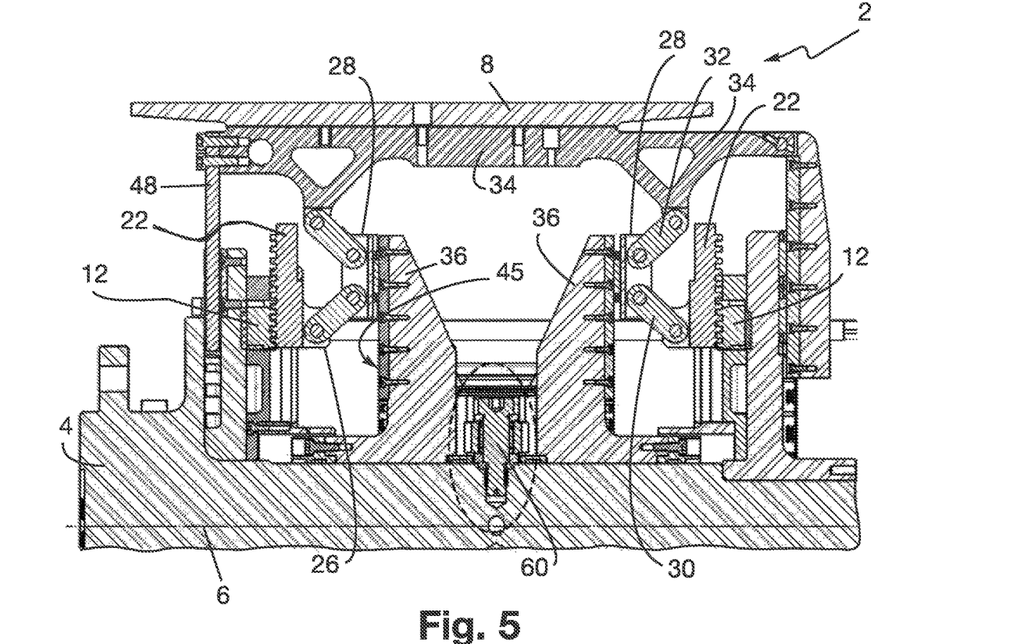
Figure 6:
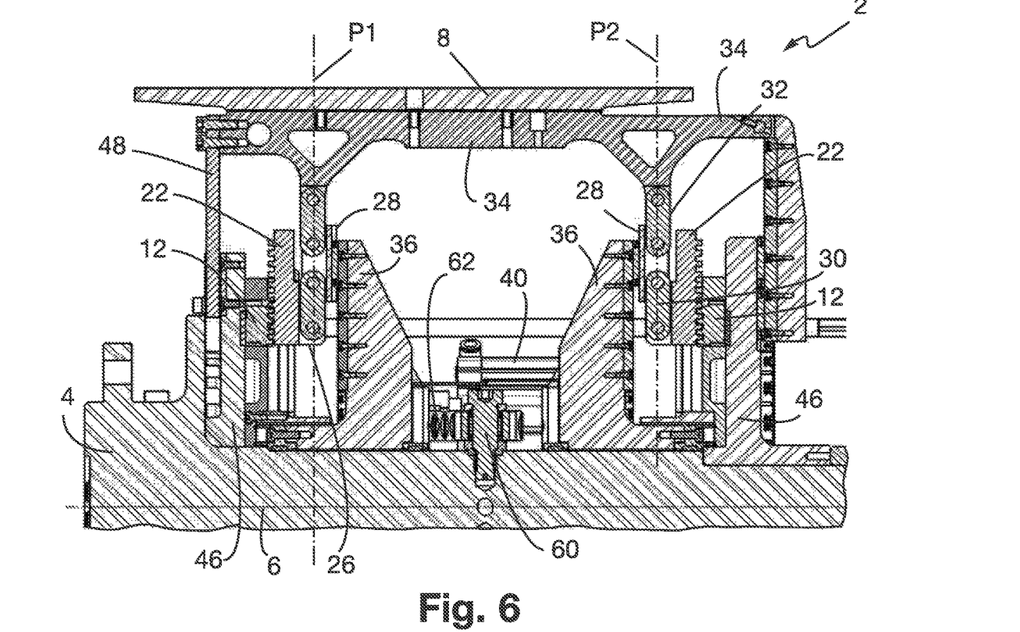
Figure 10:
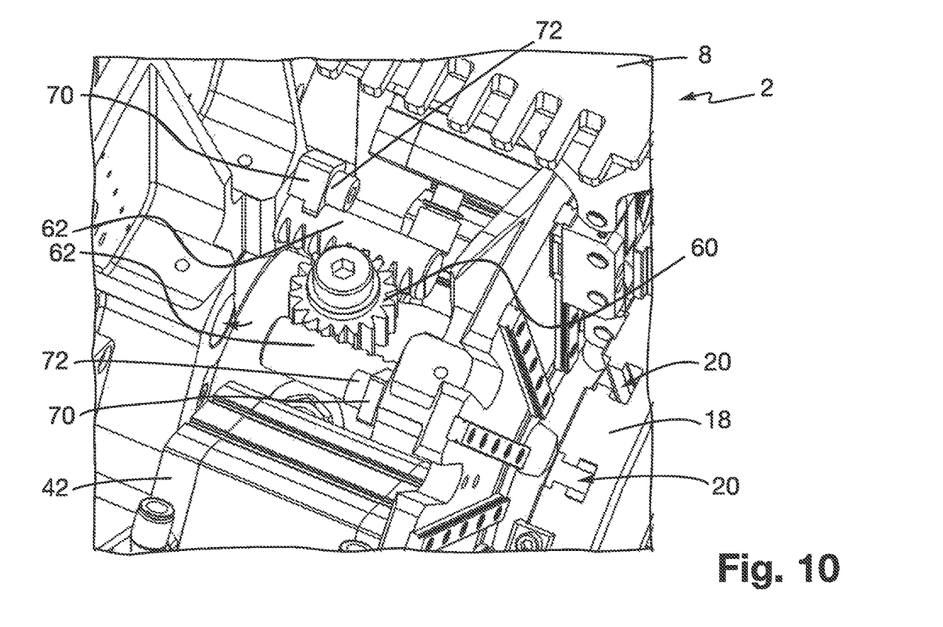
FIG. 10 is a view on a larger scale of a part of the drum from FIG. 2, similar to the latter.

As illustrated in FIGS. 5, 6 and 10, the drum comprises a median pinion 60 that is mounted so as to be able to rotate in the shaft 4 about a radial axis perpendicular to the axis 6. This pinion is engaged with two racks 62 that are respectively secured to the two actuating plates 36. This arrangement ensures symmetrical movement of these plates on either side of the mid-plane of the drum. Each rack is partially housed in a housing 67 in the opposite plate, while the plates are in their closest-together configuration. Another rack and pinion assembly is also provided, in a position diametrically opposite the first.

The drum also comprises three positioning discs 46 that are rigidly fixed to the support 4. In the left-hand part of the drum, one of the discs 46 helps to keep the cam 12 in position. In addition, it extends at a distance from the other disc 46 of the left-hand part so as to define with the latter a housing in which an arm 48 secured to the sector support 34 is mounted so as to slide in a direction perpendicular to the axis. In the right-hand part of the drum, another arm 48 of the sector support is also mounted so as to slide in a direction perpendicular to the axis against a face of the third disc 46. The three positioning discs 46 and the two arms 48 thus radially guide the sector support during its movement. Each sector support thus has its own pair of guide arms 48.

The majority of components of the drum are made of metal, for example some of aluminium and others of steel.

Figure 4:
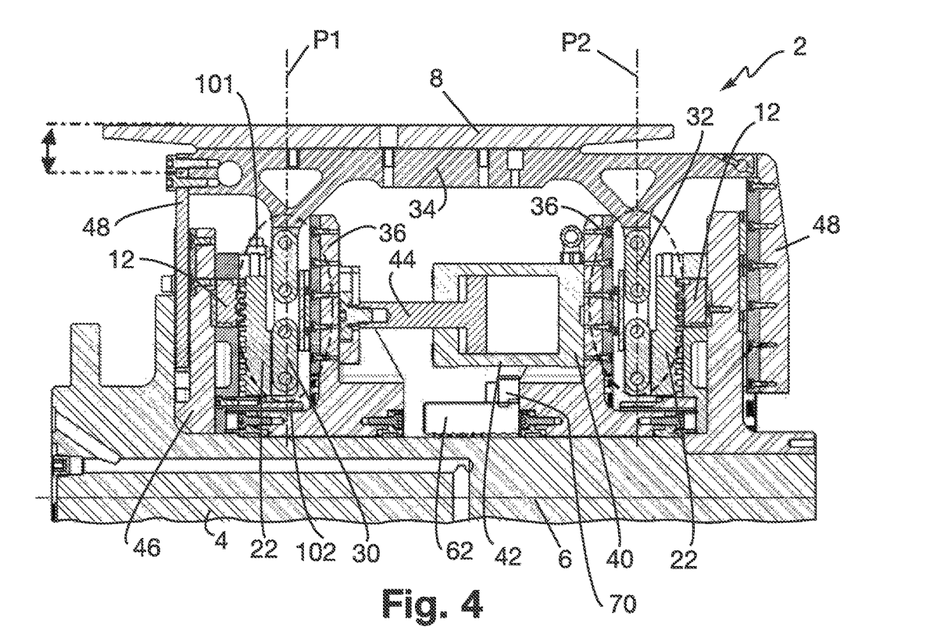

The cylinders 40, the plates 36, the connecting-rod supports and the connecting rods form expansion-retraction means of the drum and form an irreversible mechanism in the extended configuration (connecting rods aligned). Therefore, FIGS. 3 and 4 illustrate the drum in the retracted and extended configurations, respectively. In order to pass from the first to the second, the cylinders 40 are actuated, the elongation of which causes the plates 36 to move apart from one another in the direction of the axis 6. On account of the arrangement with a rack and pinion and of the radial guidance to which each sector support 34 is constrained, the mutual spacing apart of the plates 36 takes place symmetrically with respect to the mid-plane of the drum perpendicular to the axis 6. During the movement of the left-hand plate, the corresponding connecting-rod support 28 slides on the track 45 in the radial direction, moving away from the axis. Since the cam 12 and the jaws 22 are fixed so as to slide axially, this causes the connecting rod 30 to rotate about its lower axis and the upper connecting rod 32 to rock. The connecting rods thus convert axial load on the cylinders into radial load. Analogous movements take place simultaneously in the right-hand part of the drum.

Figure 1:
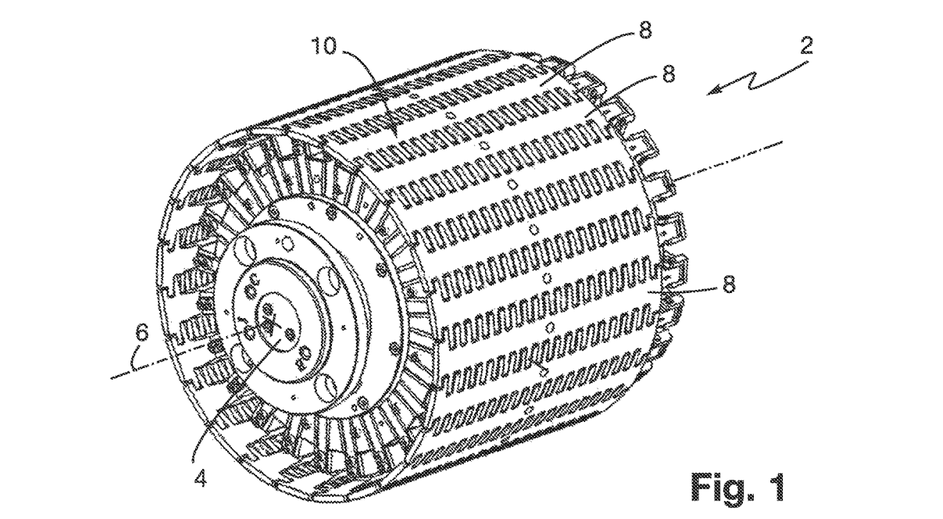
FIGS. 1 and 2 are perspective views of a drum according to one embodiment of the invention, all of the sectors being present in FIG. 1 and only one sector being present in FIG. 2.
Figure 2:
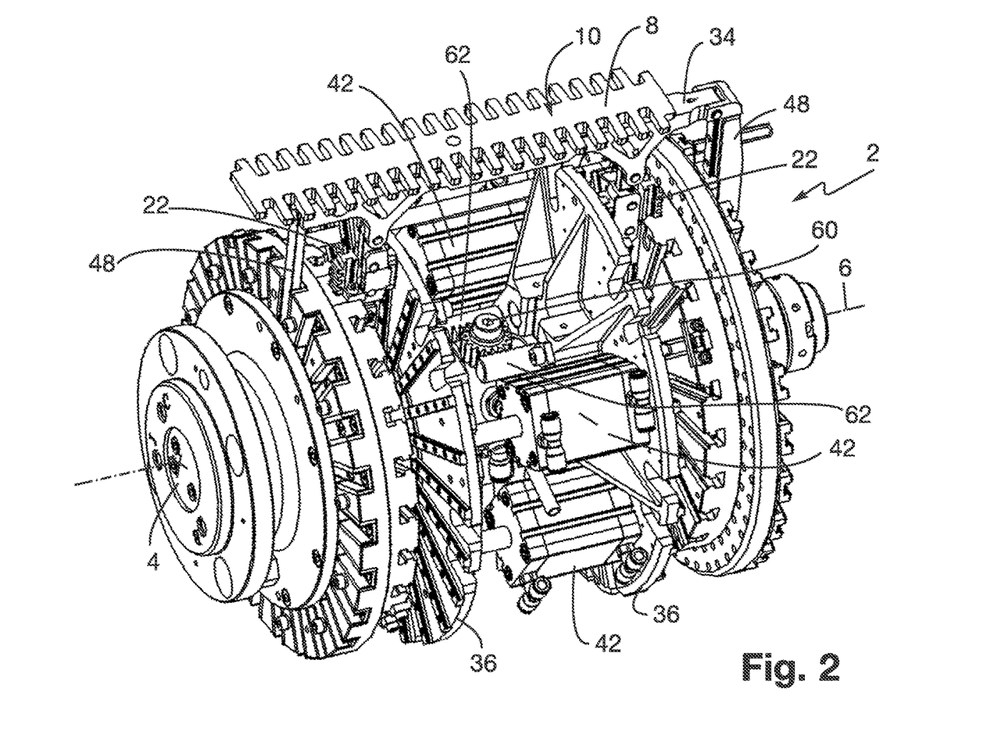

These movements cause the sector support 34 and the sector 8 to slide in the direction perpendicular to the axis 6. Given that all of the sectors 8 are initially at the same distance from the axis, as illustrated in FIG. 1, the movement which has just been described is identical and simultaneous for all of the sectors, such that, at any time in the change of configuration of the drum, all of the sectors are located at one and the same distance from the axis. The drum thus retains its cylindrical overall shape during this radial expansion. This then leads to the configuration in FIG. 4, in which the diameter of the drum measured at the external face of the sectors is greater than that measured in the configuration in FIG. 3. The configuration in FIG. 4 corresponds to the end of travel of the actuating plates 36, the plates 36 being in axial abutment against the discs 18. This abutment fixes the position of the connecting rods and of the connecting-rod supports.

In this position, the two connecting rods 30 and 32 in the left-hand part of the drum have their four hinge pins extending this time in one and the same plane P1 perpendicular to the axis 6. This same plane also includes all of the hinge pins of the connecting rods of the drum in the left-hand part. The same goes for the connecting rods in the right-hand part of the drum with their own common plane P2. Under these conditions, a radial load on the external face of the sectors 8 is transmitted to the central support 4 likewise in a radial manner and without causing an axial component to arise. This then ensures robust support of the sectors by the shaft 4 and good absorption of loads. The extended configuration is thus irreversible, since it is maintained by two irreversible mechanisms which are the expansion means and the jaw/spiral system. Thus, in this configuration, the drum is capable of withstanding, without energy input, a radial load directed toward the axis 6 when a tread is applied under tension. The system is self-locking since the two irreversible mechanisms are disposed in series. Of course, the actuation of the cylinders 40 in the reverse direction causes the plates 36 to move toward one another and return to the configuration in FIG. 3. These expansion means thus also form retraction means. In particular, the toggle joint formed by the connecting-rod support 28 and the connecting rods 30, 32 allows, once under load, the passage from the extended configuration to the retracted configuration under the effect of a small cylinder force.

Furthermore, the cams 12 and the jaws 22 form adjustment means for adjusting the diameter of the drum, which are usable independently of the actuation of the expansion means. In order to actuate the adjustment means, presuming that the system is in the configuration in FIG. 3, the cams 12 are set into rotation. Said cams, engaged with the jaws 22, cause the latter to slide in a direction perpendicular to the axis and opposite to the latter so as to lead to a configuration of the type shown in FIG. 5. During this movement, and presuming that the expansion means are inactive, the jaws of each sector entrain, in their sliding movement, the two connecting rods with their support 28 and also the sector support 34, the connecting-rod support 28 sliding against the track 45. The system has thus passed from the configuration in FIG. 3 to the one in FIG. 5 under the effect of the adjustment means and without the expansion means being actuated.

Here again, given that all of the sectors 8 are initially at the same distance from the axis, as illustrated in FIG. 1, the movement which has just been described is identical and simultaneous for all of the sectors, such that, at any time in the change of diameter of the drum, all of the sectors are located at one and the same distance from the axis. The drum thus retains its cylindrical overall shape during this change. This mechanism notably has the advantage of not requiring any disassembly in order to adjust the diameter of the drum and of forming a centralized system for adjusting the arrangement of the sectors, each sector undergoing a similar movement during the employment of the adjustment means.

FIGS. 3 and 5 correspond to the ends of travel of the cams and the jaws. The same goes for FIGS. 4 and 6. However, it is quite possible to choose an adjustment of the diameter of the drum which is intermediate between these two positions.

Furthermore, regardless of the diameter chosen during this adjustment, it is subsequently possible to control the expansion means as above. This is what has been illustrated in FIGS. 5 and 6. In said figures, with the adjustment means having determined a large diameter of the drum, the latter is passed from a retracted position to an extended position.

The mechanism of this drum thus makes it possible to choose any position of the adjustment means and then, in this position, to control the expansion means. Conversely, it makes it possible to choose any position of the expansion means and then to control the adjustment means so as to arrive at any desired position. The smallest diameter of the drum is thus obtained when the adjustment means and the expansion means are each placed in the smallest-diameter configuration. The same goes analogously for the largest-diameter configuration.

It can be seen that the adjustment means connect the expansion means to the central support 4 of the drum. Moreover, the adjustment means are disposed in series with only part of the expansion means, formed by the connecting rods 30, 32 and their support 28. The other part of the expansion means, formed by the cylinders 40 and the actuating plates 36, is designed to occupy a fixed position in a radial direction with respect to the axis. In the expansion means, the actuating plates 36 form an upstream part, with reference to a direction of transmission of the movement of these means, that is able to load the connecting-rod support 28 of these expansion means. Finally, the expansion means and the adjustment means are designed such that each sector 8 is connected to the shaft 4, common to the sectors, by means of two mutually independent supporting means.

Figure 7:
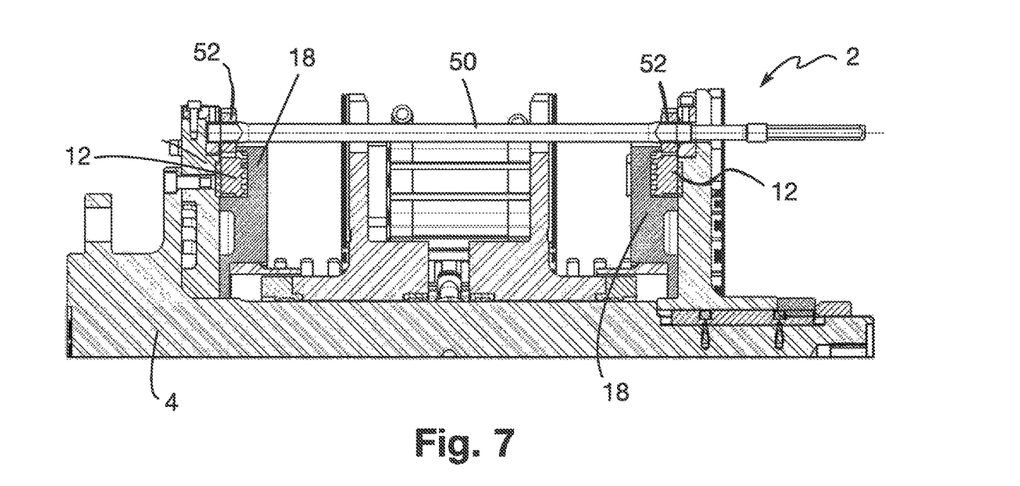
FIG. 7 is a view similar to FIG. 3, showing the connecting means of the cams.

FIG. 7 illustrates a member for synchronizing the movement of the two cams which comprises a rod 50 parallel to the axis 6 but spaced apart from the support 4. This rod bears two pinions 52 that are rigidly fixed to the rod and are each engaged with a toothed sector of one of the cams 12. This same rod can be used to drive the cams in rotation by connecting the rod to a suitable drive (not illustrated).

Figure 9:
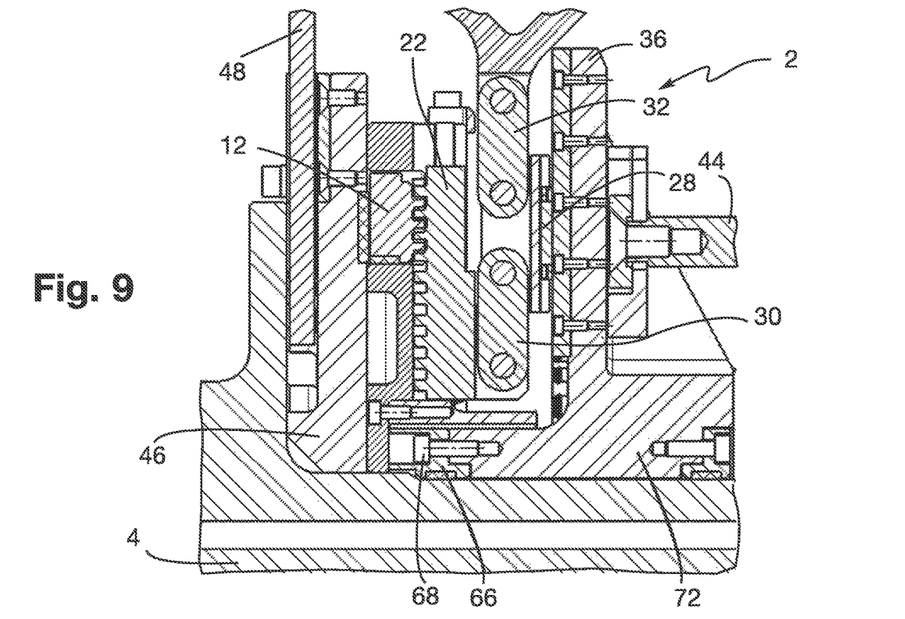
FIG. 9 is a view on a larger scale of a part of the drum from FIG. 4.

As illustrated notably in FIG. 9, each actuating plate 36 has a lip that is contiguous with the shaft 4, directed towards the plate bearing the cam 12 and provided with an axial annular extension 66 fixed to the plate for example by means of screws 68. When the actuating plates 36 take up their most spaced-apart position, they are in axial abutment against the supports of the cams via these extensions 66, as illustrated in FIGS. 4 and 6. The proper dimensioning of these extensions, via their machining for example, makes it possible to adjust the position of the aligned actuating plates. Provision can be made for the plates to be made of aluminium while the extensions forming abutment parts are made of steel.

With reference to FIG. 10, it can be seen that each rack 62 is connected to the associated actuating plate 36 by way of a support part 70. The latter is fixed to the plate by a screw 72. The rack has a notch into which a relief on the support part 70 penetrates in order to secure them together in terms of axial movement. The rack is entirely held in the support part by nesting, so as to avoid the arising of any stresses and to generate static indeterminacy. The axial dimension of the support part is chosen, for example by machining, so as to regulate the axial position of the rack with respect to an associated plate. This choice also takes place here by placing the drum in a configuration of the type shown in FIGS. 4 and 6. It is effected such that the racks give the plates in axial abutment a position such that the hinge pins of the left-hand and right-hand connecting rods are contained in their respective planes P1 and P2.

This drum serves to produce a green tire blank, for example to build a tread.

In order to produce the latter, the diameter of the drum is chosen with the adjustment means, and then the expansion means are placed in the extended configuration.

A tread is then formed by assembling various elements on the sectors while the drum is in rotation. It is notably possible to wrap one or more longitudinally reinforced strips of raw rubber at high speed in order to realize hooping of the crown belt. This wrapping can take place with relatively high tension of the strip, the absorption of loads being ensured within the drum as explained above.

Once the tread has been formed, the expansion means can be actuated in order to pass the drum into the retracted configuration in order to remove the tread.

The drum is then returned into the extended configuration by controlling the expansion means, and a new tread is formed as above.

If there is a desire to form a tread of a different model of tire which has an inside diameter different from the previous one, a new diameter is chosen on the drum with the adjustment means and this tread is formed as above.

The mechanism is sufficiently flexible and robust to make it possible for the expansion means to be actuated at relatively high speed and a very large number of times in a single day, for example several tens or several hundreds of times in order to construct just as many treads. It will furthermore be common to actuate the adjustment means only a few times during the day when the model is changed.

This drum is sufficiently rigid in the extended position to take high radial loads without deformation of the laying surface. For example, it is able to withstand a load of 120 daN per sector when a tire casing for a passenger vehicle is being manufactured. No deformation under the effect of the load is observed, for example coning or undesired collapsing of the median diameter. Given that the sectors are each joined to supporting means, loads are absorbed regardless of the location of the sector at which the load is exerted. Specifically, this location can vary along the axis 6 during the wrapping of a strip to produce the green tire.

In summary, the invention has the following advantages:
the drum exhibits radial rigidity when it is in the extended configuration, this making it notably possible to lay a tread or some other product under tension.
it is possible to use the expansion means at any adjustment of the adjustment means.
the presence of adjustment means and of expansion means on one and the same drum allows a saving of space since it is not necessary to have several different drums for a given range of drum diameters, this also avoiding any dismounting of the drum from the machine.
the expansion means are simple and can be used a large number of times in one day. They also allow good reproducibility of the laying surface of the desired product.
in the extended configuration, on account of the connecting rods, the load to be supplied by the cylinders is zero.
the extended configuration is maintained by virtue of two irreversible mechanisms formed by the alignment of the connecting rods and the jaw/spiral system in series. The device in this configuration is self-locking and allows transmission of purely radial loads.

once under load, a very small force is required to pass from the extended configuration to the retracted configuration by virtue of the mechanical toggle joint formed by the two connecting rods and the connecting-rod support.

in theory, there is no transmission of axial load, the loads being purely radial.

the adjustment means are centralized, they make it possible to modify the position of all of the sectors at the same time and in an identical manner. These adjustment means do not require any dismounting.

Of course, numerous modifications may be made to the invention without departing from the scope thereof.

The drum could be used to manufacture a part of the green tire other than the tread.

The sectors could be given a curved shape or any other profile.

The invention claimed is:

1. A drum for building a green tire casing, the drum comprising:
    sectors that form a circumferential face of the drum;
    an expander that moves the sectors radially with respect to an axis of the drum such that, at any time during movement of the sectors by the expander, all of the sectors extend at a same distance from the axis; and
    an adjuster that moves the sectors radially with respect to the axis of the drum such that, at any time during movement of the sectors by the adjuster, all of the sectors extend at an equal distance from the axis,
    wherein the adjuster moves the sectors separately from movement of the sectors by the expander, and
    wherein the expander is usable to move the sectors regardless of a position of the sectors caused by an operation of the adjuster.

2. The drum according to claim 1, wherein the expander, or the adjuster, or both the expander and the adjuster, is or are able to move each sector along a path perpendicular to the axis.

3. The drum according to claim 1, wherein the adjuster is disposed in series with some or all portions of the expander.

4. The drum according to claim 1, wherein the adjuster is disposed in series with some but not all portions of the expander.

5. The drum according to claim 1, wherein a portion of the expander is structured to have a fixed position in a radial direction with respect to the axis.

6. The drum according to claim 1, further comprising:
    a support,
    wherein the adjuster connects the expander to the support.

7. The drum according to claim 1, wherein the adjuster, or the expander, or both the adjuster and the expander, is or are formed of an irreversible mechanism.

8. The drum according to claim 1, wherein the adjuster includes at least one cam structured to be rotatable about the axis.

9. The drum according to claim 8, wherein the adjuster includes at least two cams connected together by at least one synchronization member that is separate from the expander and the sectors.

10. The drum according to claim 1, wherein the expander includes:
    a cylinder, and
    a load converter structured to convert a load on the cylinder parallel to the axis into a radial load.

11. The drum according to claim 10, wherein the load converter includes hinge pins that extend on a same plane radial to the axis.

12. The drum according to claim 1, wherein the expander includes at least one upstream portion, with reference to a direction of transmission of movement in the expander, each of the at least one upstream portion including:
    a plate that loads a downstream portion of the expander, and
    a slidable support that is mounted to enable the downstream portion to slide against the upstream portion.

13. The drum according to claim 12, wherein the at least one upstream portion includes two upstream portions connected together by a synchronization member that is separate from the adjuster and the sectors.

14. The drum according to claim 1, further comprising a support, which commonly supports all of the sectors, wherein the expander and the adjuster are structured such that each of the sectors is connected to the support via two mutually independent supporting structures.

15. The drum according to claim 1, wherein each of the sectors is a single part.

16. The drum according to claim 1, wherein each of the sectors is rigid.

17. A method for producing a green tire, the method comprising utilizing a drum for building a green tire casing, wherein the drum includes:
    sectors that form a circumferential face of the drum,
    an expander that moves the sectors radially with respect to an axis of the drum such that, at any time during movement of the sectors by the expander, all of the sectors extend at a same distance from the axis, and
    an adjuster that moves the sectors radially with respect to the axis of the drum such that, at any time during movement of the sectors by the adjuster, all of the sectors extend at an equal distance from the axis,
    wherein the adjuster moves the sectors separately from movement of the sectors by the expander, and
    wherein the expander is usable to move the sectors regardless of a position of the sectors caused by an operation of the adjuster.

* * * * *